US 9,679,427 B2

(12) United States Patent
Trammell et al.

(10) Patent No.: US 9,679,427 B2
(45) Date of Patent: Jun. 13, 2017

(54) BIOMETRIC AUDIO SECURITY

(71) Applicants: Lloyd Trammell, Thousand Oaks, CA (US); Lawrence Schwartz, Thousand Oaks, CA (US)

(72) Inventors: Lloyd Trammell, Thousand Oaks, CA (US); Lawrence Schwartz, Thousand Oaks, CA (US)

(73) Assignee: MAX SOUND CORPORATION, La Jolla, CA (US)

( * ) Notice: Subject to any disclaimer, the term of this patent is extended or adjusted under 35 U.S.C. 154(b) by 85 days.

(21) Appl. No.: 14/184,618

(22) Filed: Feb. 19, 2014

(65) Prior Publication Data
US 2015/0025889 A1   Jan. 22, 2015

Related U.S. Application Data

(60) Provisional application No. 61/766,659, filed on Feb. 19, 2013.

(51) Int. Cl.
*G10L 17/00* (2013.01)
*G10L 21/00* (2013.01)
(Continued)

(52) U.S. Cl.
CPC ......... *G07C 9/00134* (2013.01); *G06F 21/32* (2013.01); *G10L 17/005* (2013.01);
(Continued)

(58) Field of Classification Search
CPC ..... G10L 17/00; G10L 17/005; G10L 17/062; G10L 17/26; G10L 21/0316;
(Continued)

(56) References Cited

U.S. PATENT DOCUMENTS

| 2002/0020752 A1* | 2/2002 | King | G06K 13/08 235/492 |
| 2004/0080411 A1* | 4/2004 | Renfro | 340/539.1 |

(Continued)

*Primary Examiner* — Paras D Shah
(74) *Attorney, Agent, or Firm* — Robert Rose

(57) ABSTRACT

A biometric audio security system comprises providing an input voice audio source. The input audio is enhanced in two or more harmonic and dynamic ranges by re-synthesizing the audio into a full range PCM wave. A hardware key with a set of audio frequency spikes (identifiers) with varying amplitude and frequency values is provided. The enhanced voice audio input and the key using additive resynthesis are summed. The voice and the spike set is compared against the users identification signature to verify user's identity. The set of audio spikes are user specific. The spikes are stored on the protected key device as a template, which would plug into the system. The template is determined by the owner/ manufacturer of the system. The spikes are created and identified using the additive synthesis technique with a predetermined number of partials (harmonics). The identifiers include both positive and negative values. The amplitude and frequency values are spaced in very fine intervals. The enhancing of voice audio input includes the parallel processing the input audio as follows: A module that is a low pass filter with dynamic offset;
An envelope controlled band-pass filter; A high pass filter; Adding an amount of dynamic synthesized sub bass to the audio; and combining the four treated audio signals in a summing mixer with the original audio.

7 Claims, 4 Drawing Sheets

(51) Int. Cl.
*G10L 25/00* (2013.01)
*G07C 9/00* (2006.01)
*G10L 17/02* (2013.01)
*G10L 25/51* (2013.01)
*G06F 21/32* (2013.01)
*G10L 21/0316* (2013.01)

(52) U.S. Cl.
CPC .............. *G10L 17/02* (2013.01); *G10L 25/51* (2013.01); *G10L 21/0316* (2013.01)

(58) Field of Classification Search
CPC ... G10L 21/0332; G10L 21/034; G10L 13/00; G10L 13/033; G10L 13/043; H04M 2203/6054; G06F 21/32; G10H 1/0575; G10H 1/08; G10H 7/00; G10H 2250/481; G10H 2250/455; G10H 2250/615; G10H 2250/541
USPC ....... 704/231, 246, 247, 249, 250, 258, 273; 379/88.01, 88.02; 726/4, 5, 27, 28
See application file for complete search history.

(56) References Cited

U.S. PATENT DOCUMENTS

| | | | |
|---|---|---|---|
| 2005/0171774 A1* | 8/2005 | Applebaum et al. | 704/250 |
| 2006/0020460 A1* | 1/2006 | Itou | 704/246 |
| 2007/0036289 A1* | 2/2007 | Fu | G07C 9/00158 379/88.02 |
| 2007/0185718 A1* | 8/2007 | Di Mambro et al. | 704/273 |
| 2008/0140420 A1* | 6/2008 | Lee | G10L 17/00 704/273 |
| 2008/0169903 A1* | 7/2008 | Fein | G06F 21/32 340/5.84 |
| 2009/0088215 A1* | 4/2009 | Caspi | G06F 21/32 455/563 |
| 2009/0319270 A1* | 12/2009 | Gross | 704/246 |
| 2010/0049526 A1* | 2/2010 | Lewis et al. | 704/273 |
| 2011/0112838 A1* | 5/2011 | Adibi | 704/249 |
| 2014/0046664 A1* | 2/2014 | Sarkar et al. | 704/246 |

\* cited by examiner

Figure 4
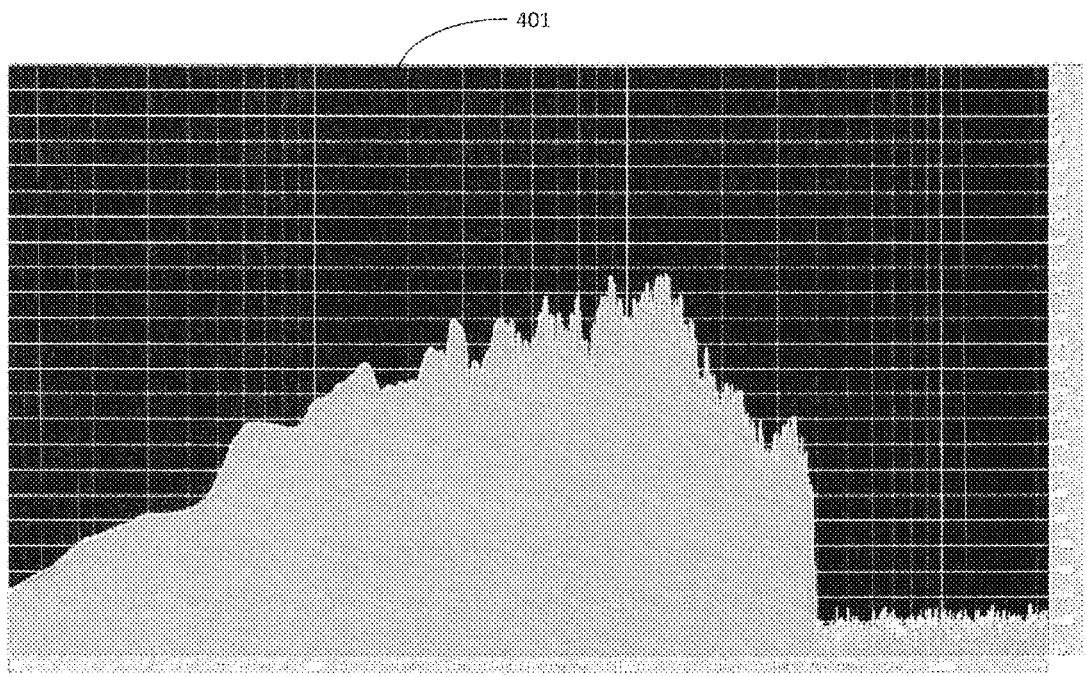
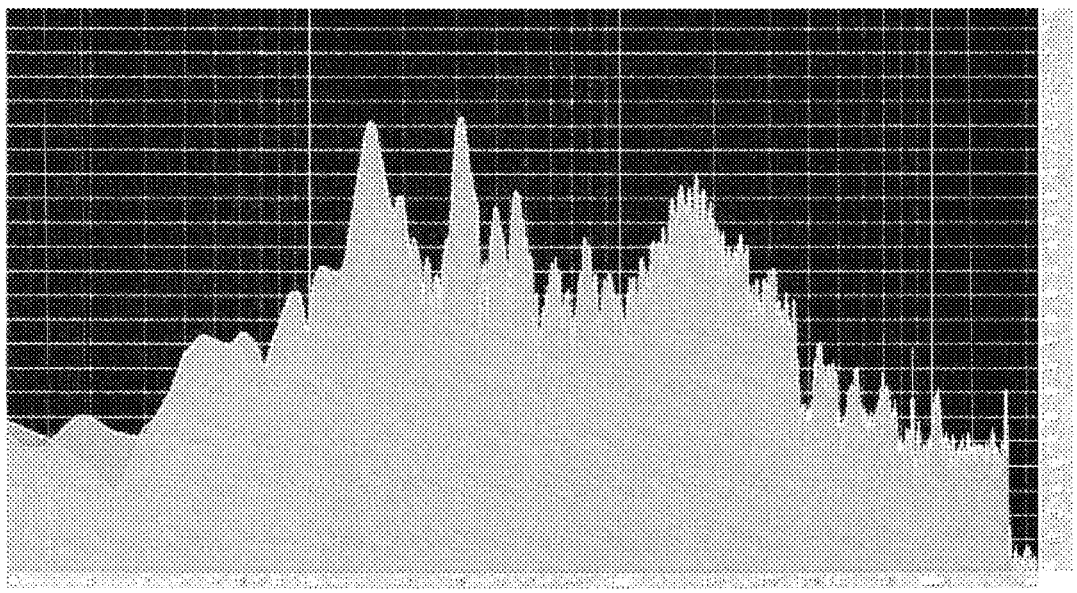

BIOMETRIC AUDIO SECURITY

CROSS-REFERENCE TO RELATED PATENT APPLICATION

Embodiments of the present invention relate to U.S. Provisional Application Ser. No. 61/766,659, filed Feb. 19, 2013, entitled "BIOMETRIC AUDIO SECURITY", the contents of which are incorporated by reference herein and which is a basis for a claim of priority.

BACKGROUND OF THE INVENTION

A biometric system is basically a digital system made up of vulnerable components such as capture devices, communication channels and databases which are subjected to a wide spectrum of replay attempts and other forms of adversary attacks. Once the biometric sample is captured in the access control application, the digital biometric representation can be intercepted and misused to provide for illegitimate authentication.

It is possible to construct waveforms using additive techniques and to analyze and deconstruct waveforms as well. It is also possible to analyze the frequency partials of a recorded sound and then resynthesize a representation of the sound using a series of sinusoidal partials. By calculating the frequency and amplitude weighting of partials in the frequency domain (typically using a Fast Fourier transform), an additive resynthesis system can construct an equally weighted sinusoid at the same frequency for each partial. Older techniques rely on banks of filters to separate each sinusoid; their varying amplitudes are used as control functions for a new set of oscillators under the user's control. Because the sound is represented by a bank of oscillators inside the system, a user can make adjustments to the frequency and amplitude of any set of partials. The sound can be 'reshaped'—by alterations made to timbre or the overall amplitude envelope, for example. A harmonic sound could be restructured to sound inharmonic, and vice versa.[1]

[1] http://en.wikibooks.org/wiki/Sound_Synthesis_Theory/Additive_Synthesis

Since biometric information describes a person, it is unlikely to be reset or reproduced should it be compromised unlike passwords or smartcards. Hence, the protection of the biometric data itself is of utmost importance, in order to allay anxiety among users over the privacy of their biometrics data. Acceptance of the system is also influenced by the security measures implemented on the biometric data.

Although single-modality biometric systems can achieve high performance in some cases, they are usually not robust except under ideal conditions and do not meet the needs of many potential voice recognition applications. These conditions can cause the system to be very inefficient and produce false positives that could compromise the security position of the system in which it is installed to protect.

There are many factors that can affect the quality and degradation of the audio such as environmental and extraneous audio from the environment where the system is installed. In one conventional system, the user usually speaks a key word or phrase into some type of microphone and that single audio clip is compared against one that has been stored for comparison and authentication. More complex systems include several multisampling processors involved to divide the input audio, slice it into smaller sections and compare those with better resolution. While this latter method is an improvement, it fails to provide the high level of accuracy often required in our times.

Recent advances in biometric technologies coupled with the increased threats in information security has proliferated the applications of biometric systems to safe-guard information and its supporting processes, systems and infrastructures. Physical and logical access controls are essentially based on user authentication whereby an individual's identity is verified through either one of the three following means:

by something he knows', 'by something he has' or 'by something he is' (or through combinations of any of the three means).

Traditional approaches are basically based on the first two methods. The former implies password authentication that can be forgotten, guessed or cracked through dictionary or brute forced attacks, whereas the latter involves the use of tokens as identifiers such as keys or smartcards for authentication purposes. Unfortunately, the second method is also at risk of being shared, lost, duplicated, or stolen. The emerging solution is based on biometric which is claimed to be more reliable and more fool-proof that relies on 'something that you are', to make personal authentication. For example, a voice recognition system which worked well with a quiet background, will not be as accurate in a real world environment. Thus becoming slow and ineffective as it must perform the security identification task multiple times in order to pass a positive or false positive response to the system.

There is therefore a need for a biometric identification method and system that addresses the above noted deficiencies of the conventional systems and methods.

SUMMARY OF THE INVENTION

The biometric audio security (BAS) system of the present invention receives an input voice audio source. The input audio is enhanced in two or more harmonic and dynamic ranges by re-synthesizing the input audio into a full range PCM wave. A hardware key with a set of audio frequency spikes (identifiers) with varying amplitude and frequency values is provided. The enhanced voice audio input and the key using additive resynthesis are summed. The voice and the spike set combination is compared against the users identification signature to verify user's identity. The set of audio spikes are user specific. The spikes are stored on the protected key device as a template, which would plug into the system. The template is determined by the owner/manufacturer of the system. The spikes are created and identified using the additive synthesis technique with a predetermined number of partials (harmonics). The identifiers include both positive and negative values. The amplitude and frequency values are spaced in very fine intervals. The enhancing of voice audio input includes the parallel processing the input audio as follows: A module that is a low pass filter with dynamic offset; An envelope controlled band-pass filter; A high pass filter; Adding an amount of dynamic synthesized sub bass to the audio; and combining the four treated audio signals in a summing mixer with the original audio.

BRIEF DESCRIPTION OF THE DRAWINGS

FIG. 4 shows non processed speech and its counterpart processed by the inventive BAS of the present invention.

DETAILED DESCRIPTION OF THE INVENTION

The inventive BAS system of the present application is not a way of protecting audio. Rather, it is a process of utilizing audio, more specifically, additive synthesis and resynthesis, to produce a unique way of identifying a single source or subject. The BAS system consists of a programmable hardware device (Key), the Signature Storage device which holds the information and processing needed for comparison and the final locking (security) device which can be any type available. This entire process is a DSP software based solution that requires DSP processing capability in the host.

Figure 2:
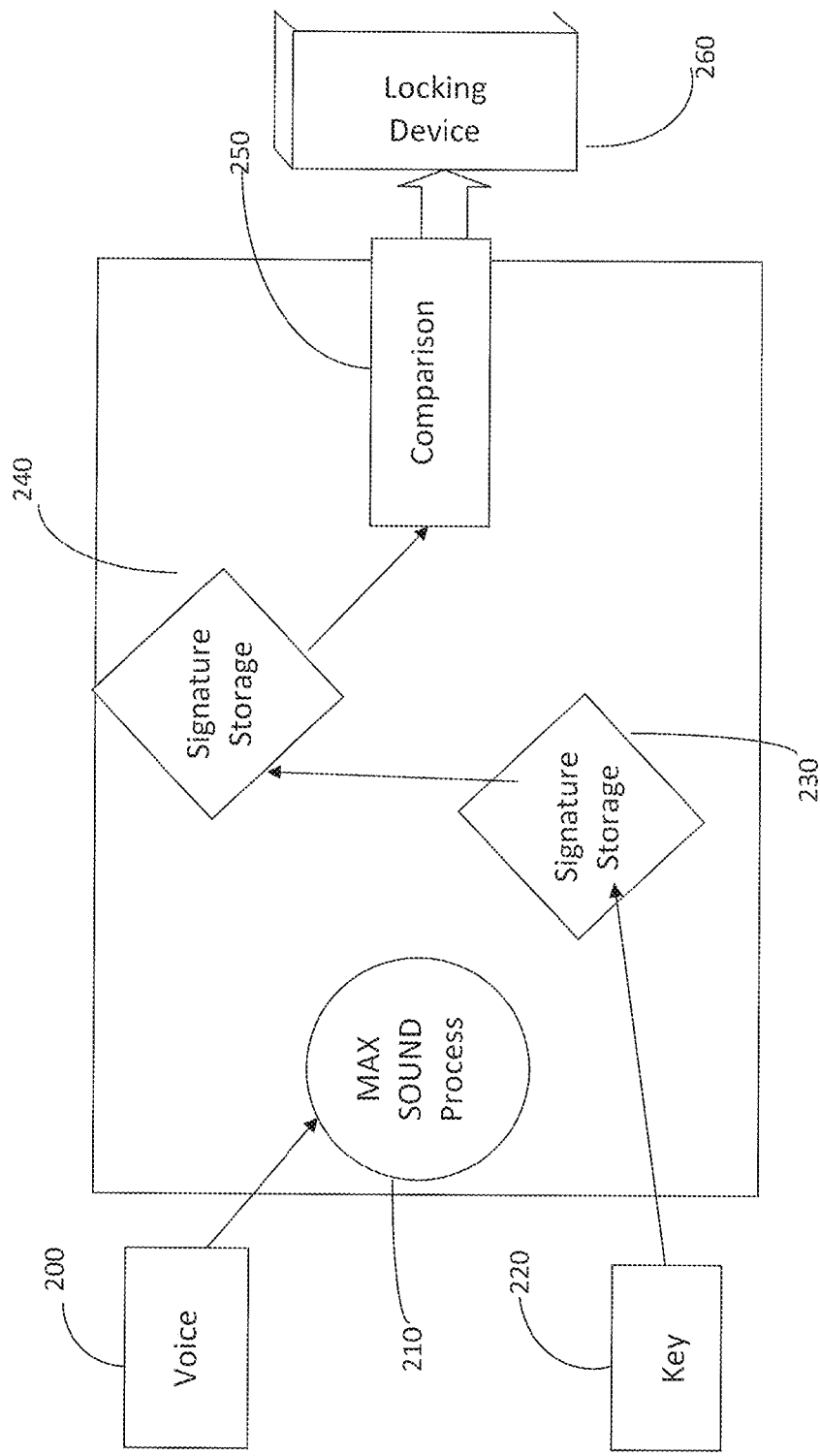
FIG. 2 shows the BAS increases the integrity of audio used for biometric identification. The following is a description an exemplary embodiment of the inventive BAS.
Figure 3:
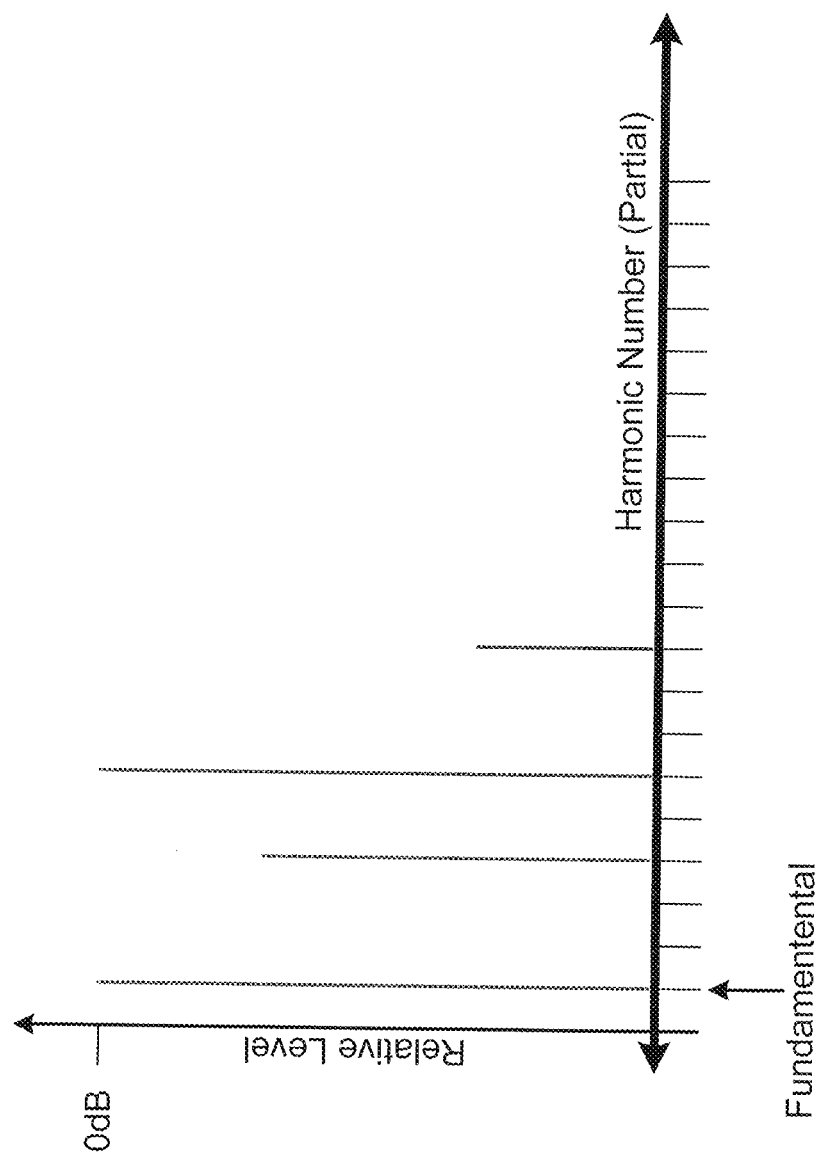
FIG. 3 shows an example of an additive synthesis key and the Relative Level as a function of the Harmonic Number (partial).

The BAS increases the integrity of audio used for biometric identification. The following is a description an exemplary embodiment of the inventive BAS explained by reference to FIG. 2. Voice 200 represents the intended voice that will be examined for identification. Voice is processed with the Max Sound process 210 (further described below) for enhancement. The MAX SOUND process (MS) 210 will enhance the audio content by restoring any deficiencies (audio content/harmonics) lost because of a low quality source (microphone), environmental issues, or degradation in the audio path giving you a better source for BAS. At the same time the MAX SOUND process can lessen the amount of noise it perceives in the audio it receives. FIG. 3 provides an example of harmonic content of both non processed and processed speech. In one embodiment Key 220 is a hardware that includes a set of audio frequency spikes (identifiers) in it, both positive and negative, with varying amplitude and frequency in extremely fine amounts. These collections of audio spikes are specific per user. These spikes are created and identified using the additive synthesis technique with a predetermined number of "partials" (harmonics) and stored on the protected key device, as a template (the protection scheme is determined by the owner/manufacturer of the system), which would plug into the system much like a USB device plugs into a computer. Voice 200 and key 220 are summed together in Summing Mixer 230 to create a complete and secure identification signature using additive resynthesis. This creates an even more secure method of identification.

According to one embodiment, a computer or storage device that has both the voice and the spike set (both of these create a unique single linked complex template when combined) are stored to use as a comparison against the users identification "signature" kept in Signature Storage 240. Comparison 250 performs a comparison of the output of the Summing Mixer 230 and the signature stored in Signature Storage will be made and a yes or no response will be generated for access for the security device through Locking Device 260.

The inventive BAS is an active, dynamic system therefore it is very secure. Securing a biometric template essentially involves encryption with irreversibility properties, making it difficult for hackers to compute or deduce the original biometric information from a secure template. Another essential criterion for each generated biometric template is called 'unlinkable' which emphasizes on its uniqueness. This is important in order to increase security aspects particularly because the same biometric characteristics may be used to identify an individual in different applications. For example, assuming that the same scheme is applied for two different BAS biometric applications, one which grants physical access to a secure building where the biometric template is stored on a smartcard, while another performs authentication with a centralized database that provides administrative privileges to an account. Should a hacker manage to retrieve a legitimate biometric template from a stolen smartcard, he will not be able to use this template to gain access to the user's account, though both verifications may be based on the same biometric identifier, or template, of the user.

Figure 1:
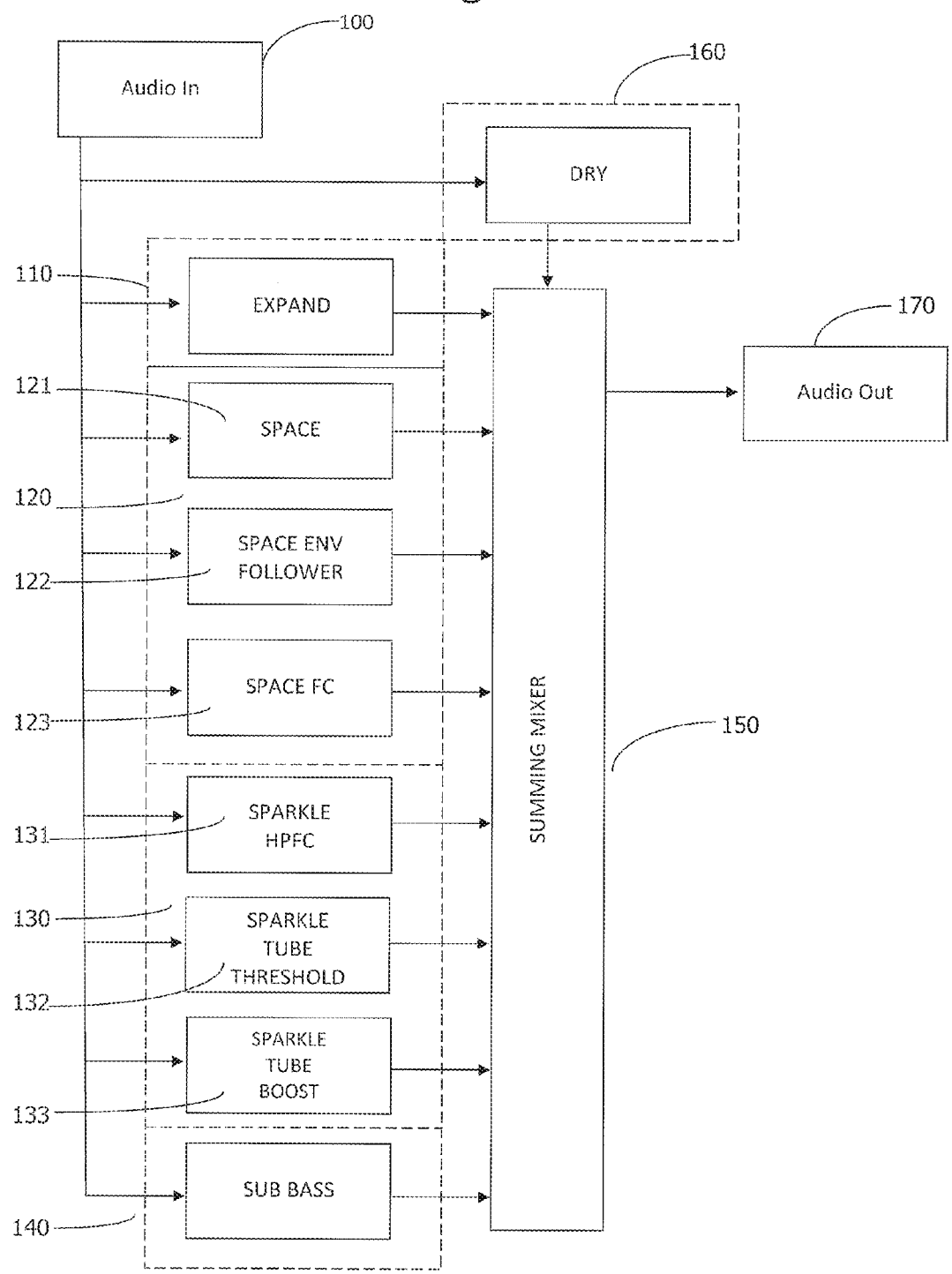
FIG. 1 shows the Max Sound module of the present invention in accordance with one exemplary embodiment.

The Max Sound module of the present invention in accordance with one exemplary embodiment will now be described by reference to FIG. 1.

Audio input 100 is stored in a buffer. There are specific controls that are available to an end user. These controls 220 allow a user to adjust presets 230, WAT 240, or bypass 250 the process.

There can be multiple types of presets available. Each preset 230 will select a specific genre of music. Another preset can be auto-preset that is selected by genre in metadata. Yet another preset is a single generic preset that covers all music. Preset 230 consists of the modules below, with explanation of same. Advantageously, controls 220 are not exposed in the API 210, only a name which represents the settings for that particular setting (preset). Explanation of the functions are provided below.

In one exemplary embodiment, EXPAND 110 is a 4 pole digital low pass filter with an envelope follower for dynamic offset (fixed envelope follower). This allows the output of the filter to be dynamically controlled so that the output level is equal to whatever the input is to this filter section. For e.g., if the level at the input is −6 dB, then the output will match that. Moreover, whenever there is a change at the input, the same change will occur at the output regardless of either positive or negative amounts. The frequency for this filter is, e.g., 20 to 20 k hertz, which corresponds to a full range. The purpose of EXPAND 110 is to "warm up" or provide a fuller sound as audio 100 passes through it. The original sound 100 passes through, and is added to the effected sound for its output. As the input amount 100 varies, so does the phase of this section. This applies to all filters used in this software application. Preferably all filters are of the Butterworth type.

Next, we discuss SPACE 120. In FIG. 1, SPACE 120 refers to the block of three modules identified by reference numerals 121, 122 and 123. The first module SPACE 121—which follows EXPAND 110 envelope follower, sets the final level of this module. This is the effected signal only, without the original. SPACE ENV FOLLOWER 122 tracks the input amount and forces the output level of this section to match. SPACE FC 123 sets the center frequency of the 4 pole digital high pass filter used in this section. This filter also changes phase as does EXPAND 110.

SPACE blocks 120 are followed by the SPARKLE 130 blocks. Like SPACE 120, there are several components to SPARKLE. In one embodiment, SPARKLE HPFC 131 is a 2 pole high pass filter with a preboost which sets the lower frequency limit of this filter. Anything above this setting passes through the filter while anything below is discarded or stopped from passing. SPARKLE TUBE THRESH 132 sets the lower level at which the tube simulator begins working. As the input increases, so does the amount of the tube sound. The tube sound adds harmonics, compression and a slight bit of distortion to the input audio 100. This amount increases slightly as the input level increases.

SPARKLE TUBE BOOST 133 sets the final level of the output of this module. This is the effected signal only, without the original.

Next, the SUB BASS 140 module is discussed. This module takes the input signal and uses a low pass filter to set the upper frequency limit to about 100 Hz. An octave divider occurs in the software that changes the input signal to lower by an octave (12 semi tones) and output to the only control in the interface, which is the level or the final amount. This is the effected signal only, without the original.

All of the above modules 110 to 140 are directed into SUMMING MIXER 160 which combines the audio. The levels going into the summing mixer 160 are controlled by the various outputs of the modules listed above. As they all combine with the original signal 100 fed through the DRY 150 module there is interaction in phase, time and frequencies that occur dynamically. These changes all combine to create a very pleasing audio experience for the listener in the form of "enhanced" audio content. For example, a change in a single module can have a great affect on what happens in relation to the other modules final sound or the final harmonic output of the entire software application.

FIG. 3 shows an example of an additive synthesis key. It shows the Relative Level as a function of the Harmonic Number (partial).

FIG. 4 shows non processed speech (401) and its counterpart processed by the inventive BAS of the present invention (402). As can be clearly seen is the addition of more, and clearer harmonic content. By having a much more harmonic content to work with, the system has more to use in making the identification.

What is claimed is:

1. A method for biometric audio security, comprising:
providing an input voice audio source;
enhancing the voice audio input in two or more harmonics and dynamic ranges by re-synthesizing the audio into a full range PCM wave;
providing a hardware key with a set of audio frequency spikes with varying amplitude and frequency values;
plugging the hardware key into a system;
upon plugging the hardware key into the system, summing the enhanced voice audio input and the set of audio frequency spikes provided in the key using additive resynthesis; and
comparing the voice and the set of audio frequency spikes against a user's identification signature to verify a user's identity
providing access to a security device, via a locking device, based on the comparing.

2. The method of claim 1 wherein the set of audio spikes are user specific.

3. The method of claim 1 wherein the spikes are stored on a protected key device as a template, which would plug into the system.

4. The method of claim 3 wherein the template is determined by an owner/manufacturer of the system.

5. The method of claim 1 wherein the spikes are created and identified using an additive synthesis technique with a predetermined number of partials (harmonics).

6. The method of claim 1 wherein the identifiers include both positive and negative values.

7. The method of claim 1 wherein the amplitude and frequency values are spaced in very fine intervals.

* * * * *